(12) United States Patent
Yang et al.

(10) Patent No.: US 12,390,938 B2
(45) Date of Patent: Aug. 19, 2025

(54) DEVICE AND METHOD FOR REMOVING FOREIGN OBJECT FROM HEAT TRANSFER TUBE

(71) Applicant: DOOSAN ENERBILITY CO., LTD., Changwon-si (KR)

(72) Inventors: Sungkyu Yang, Gimhae (KR); Hyunsang Kong, Changwon (KR); Deokil Kim, Changwon (KR); Kideok Seong, Changwon (KR); Yoo Yang, Busan (KR); Jaebong Lee, Changwon (KR); Taebong Lee, Jinju (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 128 days.

(21) Appl. No.: 18/517,308

(22) Filed: Nov. 22, 2023

(65) Prior Publication Data

US 2024/0255242 A1 Aug. 1, 2024

(30) Foreign Application Priority Data

Jan. 30, 2023 (KR) .................. 10-2023-0012031

(51) Int. Cl.
*F22B 37/00* (2006.01)
*B25J 11/00* (2006.01)

(52) U.S. Cl.
CPC .......... *B25J 11/005* (2013.01); *F22B 37/002* (2013.01)

(58) Field of Classification Search
CPC .............................. B25J 11/005; F22B 37/002
See application file for complete search history.

(56) References Cited

U.S. PATENT DOCUMENTS 5,286,154 A * 2/1994 Jens ................. F28G 1/166
294/100
5,575,328 A * 11/1996 Hyp .................. F22B 37/002
165/95

FOREIGN PATENT DOCUMENTS

| KR | 20-0420038 B1 | | 6/2006 |
|----|---------------|----|--------|
| KR | 20180074349 A | * | 7/2018 |
| KR | 10-1937378 B1 | | 1/2019 |
| KR | 10-2021-0056138 A | | 5/2021 |

* cited by examiner

*Primary Examiner* — Eric S Ruppert
(74) *Attorney, Agent, or Firm* — Harvest IP Law, LLP

(57) ABSTRACT

Proposed are device and method for removing a foreign object from a heat transfer tube, and the device includes a reel part configured to wind or unwind a connecting tube, a drive part, disposed adjacent to the reel part, configured to move the connecting tube in and out of a heat transfer tube, and to operate so that the connecting tube is rotatable inside the heat transfer tube, and a manipulator, disposed on an end part of the connecting tube, configured to be inserted into the heat transfer tube and to remove a foreign object placed between the heat transfer tube and an adjacent heat transfer tube, wherein the manipulator is configured to hold and transport at least a portion of the foreign object.

15 Claims, 14 Drawing Sheets

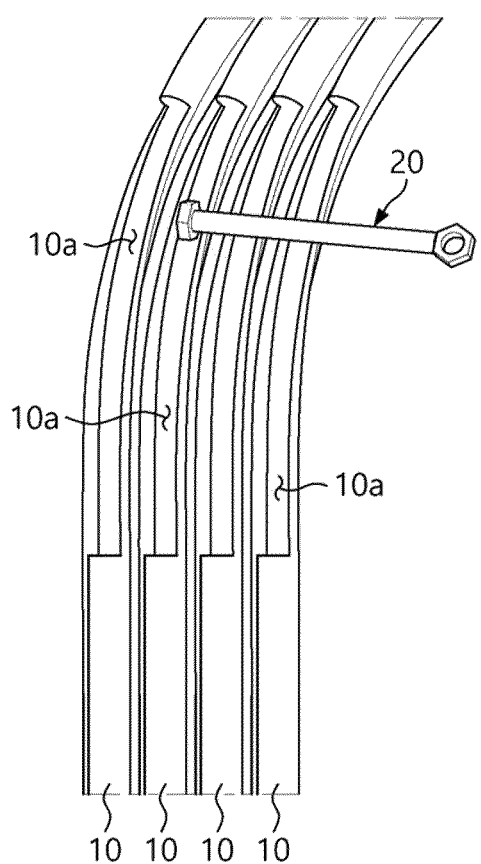

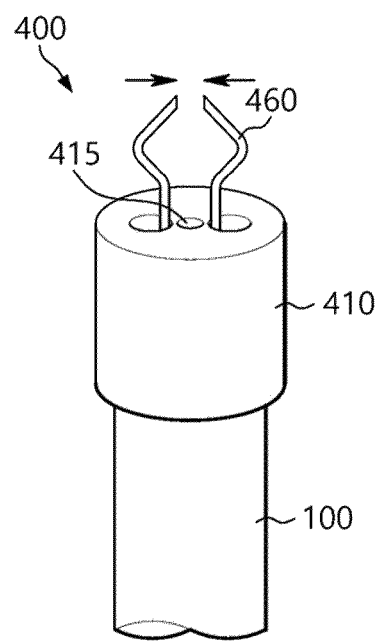

DEVICE AND METHOD FOR REMOVING FOREIGN OBJECT FROM HEAT TRANSFER TUBE

CROSS REFERENCE TO RELATED APPLICATION

The present application claims priority to Korean Patent Application No. 10-2023-0012031, filed on Jan. 30, 2023, the entire contents of which are incorporated herein for all purposes by this reference.

BACKGROUND

1. Technical Field

The present disclosure relate to device and method for removing a foreign object from a heat transfer tube. More particularly, the present disclosure relate to device and method for removing a foreign object from a heat transfer tube, which enables an easy removal of a foreign object located between heat transfer tubes of a steam generator.

2. Description of the Background Art

Generally, a steam generator in a nuclear power plant is one of the most important core devices that generates steam required to produce electricity from steam turbines and generators.

Specifically, a bundle of multiple heat transfer tubes is provided inside the steam generator. These heat transfer tubes provide a heat exchange function between primary system water, which includes radioactivity, and secondary system water, which turns a turbine. The heat transfer tubes also function to separate the primary system water from the secondary system water.

Looking at a steam generation process, primary system water is heated while the primary system water passes through a nuclear reactor and flows inside the heat transfer tube of a steam generator along the tube. Secondary system water is supplied to the outside of the heat transfer tube. The primary system water and the secondary system water exchange heat each other with the tube wall of the heat transfer tube provided therebetween. After this heat exchange, the primary system water is circulated back to the nuclear reactor along the tube of a closed circuit pipe, and the secondary system water is converted to steam.

High-temperature and high-pressure radioactive water (the primary system water) flows inside the heat transfer tube, and non-radioactive water (the secondary system water) flows outside the heat transfer tube with the heat transfer tube provided between the radioactive water and the non-radioactive water. Accordingly, when the heat transfer tube is damaged, it is possible for the primary system water flowing inside the inside of the heat transfer tube to leak into the outside and become mixed with the non-radioactive water (the secondary system water), resulting in contamination. Consequently, there is a risk that an entire area where the non-radioactive water (the secondary system water) is converted to steam and supplied may become radioactively contaminated. Therefore, securing the integrity of the heat transfer tube is of utmost importance for a nuclear power plant.

Conventional foreign object inspection and removal of a steam generator focused on inspecting and removing foreign objects in an upper gap of a tube plate inside a bundle of heat transfer tubes. However, it was difficult to remove foreign objects located at the upper part (a heat transfer tube support plate) of the bundle of the heat transfer tubes. In addition, with an conventional device, it may be possible to remove small foreign objects such as sludge, wire, and welding rods, but it is not easy to remove a large object, such as a bolt, etc. Therefore, the need to develop technologies for solving this problem is becoming increasingly evident.

SUMMARY

Accordingly, the present disclosure has been made keeping in mind the above problems occurring in the related art. An objective of the present disclosure is to provide device and method for removing a foreign object from a heat transfer tube, especially when dealing with a large foreign object situated between heat transfer tubes.

In order to achieve the above objective, according to an embodiment of the present disclosure, there is provided a device for removing a foreign object from a heat transfer tube, the device including: a reel part configured to wind or unwind a connecting tube; a drive part, disposed adjacent to the reel part, configured to move the connecting tube in and out of a heat transfer tube, and to operate so that the connecting tube is rotatable inside the heat transfer tube; and a manipulator, disposed on an end part of the connecting tube, configured to be inserted into the heat transfer tube and to remove a foreign object placed between the heat transfer tube and an adjacent heat transfer tube, wherein the manipulator is configured to hold and transport at least a portion of the foreign object.

According to the embodiment of the present disclosure, the manipulator may include: a first part fixedly coupled with the end part of the connecting tube; a second part protruding upward from the first part along a portion of a circumference of the first part; and third parts protruding from two opposite ends of the second part along a circumferential direction of the first part such that an inner space is defined between the second part and the third parts.

According to the embodiment of the present disclosure, the manipulator may include fourth parts protruding upward from end parts of the third parts, respectively, in a direction parallel to a protruding direction of the second part, the fourth parts protruding further upward than the second part.

According to the embodiment of the present disclosure, each of the fourth parts may include: a first surface protruding further upward as a distance between the first surface and an opening between the third parts increases; and a second surface bending and extending from an end part of the first surface, with the second surface being introduced gradually downward as a distance between the second surface and the opening between the third parts increases.

According to the embodiment of the present disclosure, a first opening may be formed between the first part and the third parts, a second opening may be formed between the third parts protruding respectively from opposite sides of the second part, and a third opening may be formed between the fourth parts and the second part.

According to the embodiment of the present disclosure, the foreign object may be an eye bolt, a head of the bolt may be inserted into the third opening, a body of the bolt may be inserted into the second opening, and an end part of the bolt opposite to the head of the bolt may be inserted into the first opening.

According to the embodiment of the present disclosure, the fourth parts may protrude respectively from the third parts facing each other, and the fourth parts facing each other may be configured to be manipulated so that a distance between the fourth parts decreases or increases.

According to the embodiment of the present disclosure, the manipulator may further include a camera disposed inside the first part, and a camera hole may be formed in a center part of a surface of the first part facing the third parts such that the camera is capable of taking a picture through the camera hole.

According to the embodiment of the present disclosure, the manipulator may include: the first part fixedly coupled with the end part of the connecting tube; and grippers provided respectively on opposite sides of the first part by protruding from the first part, with a distance between the grippers increasing and decreasing as a distance between positions of the grippers and the first part increases.

According to the embodiment of the present disclosure, the grippers may be configured to be manipulated such that the distance between the grippers increases and decreases.

According to the embodiment of the present disclosure, the grippers may be configured to be rotatable.

In addition, in order to achieve the above objective, according to another embodiment of the present disclosure, there is provided a method for removing a foreign object from a heat transfer tube, the method including: cutting at least a portion of a heat transfer tube where a foreign object is located and an adjacent heat transfer tube; moving a connecting tube upward to which a manipulator is mounted by inserting the connecting tube into the heat transfer tube; holding a portion of the foreign object by an end part of the manipulator; seating the foreign object in the manipulator by gravity by moving the manipulator; and discharging the manipulator out of the heat transfer tube.

According to the another embodiment of the present disclosure, the manipulator may include: the first part fixedly coupled with an end part of the connecting tube; the second part protruding upward from the first part along a portion of a circumference of the first part; and the third parts protruding from two opposite ends of the second part along a circumferential direction of the first part such that an inner space is defined between the second part and the third parts.

According to the another embodiment of the present disclosure, the manipulator may include the fourth parts protruding upward from end parts of the third parts, respectively, in a direction parallel to a protruding direction of the second part, the fourth parts protruding further upward than the second part.

According to the another embodiment of the present disclosure, each of the fourth parts may include: the first surface protruding further upward as a distance between the first surface and an opening between the third parts increases; and the second surface bending and extending from an end part of the first surface, with the second surface being introduced gradually downward as a distance between the second surface and the opening between the third parts increases.

According to the another embodiment of the present disclosure, the first opening may be formed between the first part and the third parts, the second opening may be formed between the third parts protruding respectively from opposite sides of the second part, and the third opening may be formed between the fourth parts and the second part.

According to the another embodiment of the present disclosure, the foreign object may be the eye bolt, the head of the bolt may be inserted into the third opening, the body of the bolt may be inserted into the second opening, and the end part of the bolt opposite to the head of the bolt may be inserted into the first opening.

According to the another embodiment of the present disclosure, the fourth parts may protrude respectively from the third parts facing each other, and the fourth parts facing each other may be configured to be manipulated so that the distance between the fourth parts decreases or increases.

According to the another embodiment of the present disclosure, the manipulator may further include the camera disposed inside the first part, and the camera hole may be formed in the center part of the surface of the first part facing the third parts such that the camera is capable of taking a picture through the camera hole.

According to the another embodiment of the present disclosure, in the seating of the foreign object in the manipulator by gravity, the manipulator may perform at least one of an upward movement, a downward movement, and a rotation inside the heat transfer tube.

According to the device for removing a foreign object from a heat transfer tube according to the present disclosure, the fourth parts facing each other can be manipulated to make a distance between the fourth parts decrease or increase, thereby adjusting the distance between the opposite sides of the fourth parts by corresponding to the size of a foreign object. In addition, after a foreign object is gripped or held by the manipulator, the distance between the fourth parts can be decreased, thereby preventing the foreign object gripped by the manipulator from escaping to the outside.

According to the device for removing a foreign object from a heat transfer tube of the present disclosure, when a foreign object (a bolt) is held by the manipulator, an environment at which the foreign object is located and the position of the foreign object can be identified through the camera disposed in the manipulator so that the removal of the foreign object can be performed.

According to the device for removing a foreign object from a heat transfer tube according to an embodiment of the present disclosure, the manipulator includes protruding parts on which at least a portion of a foreign object can be held through the first part, the second part, the third parts, and the fourth parts, and space in which the foreign object can be accommodated through the first opening, the second opening, and the third opening.

In addition, according to the device for removing a foreign object from a heat transfer tube according to an embodiment of the present disclosure, since the manipulator can move up and down and rotate, the manipulator is configured so that a bulky foreign object such as the bolt occupies a small area in the first opening, the second opening, and the third opening described above and is more easily accommodated therein. Accordingly, a bulky foreign object such as the bolt is accommodated by the manipulator and thus can be more easily discharged through a heat transfer tube to the outside of the steam generator.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 4A and 4B are diagrams illustrating a state in which at least a portion of heat transfer tubes in which a foreign object is located is cut;

FIGS. 8A, 8B, and 8C are diagrams illustrating a manipulator according to another embodiment of the present disclosure.

DETAILED DESCRIPTION

Hereinafter, exemplary embodiments of the present disclosure will be described in detail with reference to the accompanying drawings. Terms and words used in this specification and claims should not be construed as limited to their usual or dictionary meanings. Instead, based on the principle that the inventor can appropriately define the concepts of the terms in order to explain his or her invention in the best way, the terms are required to be interpreted as meanings and concepts consistent with the technical idea of the present disclosure.

Figure 1:
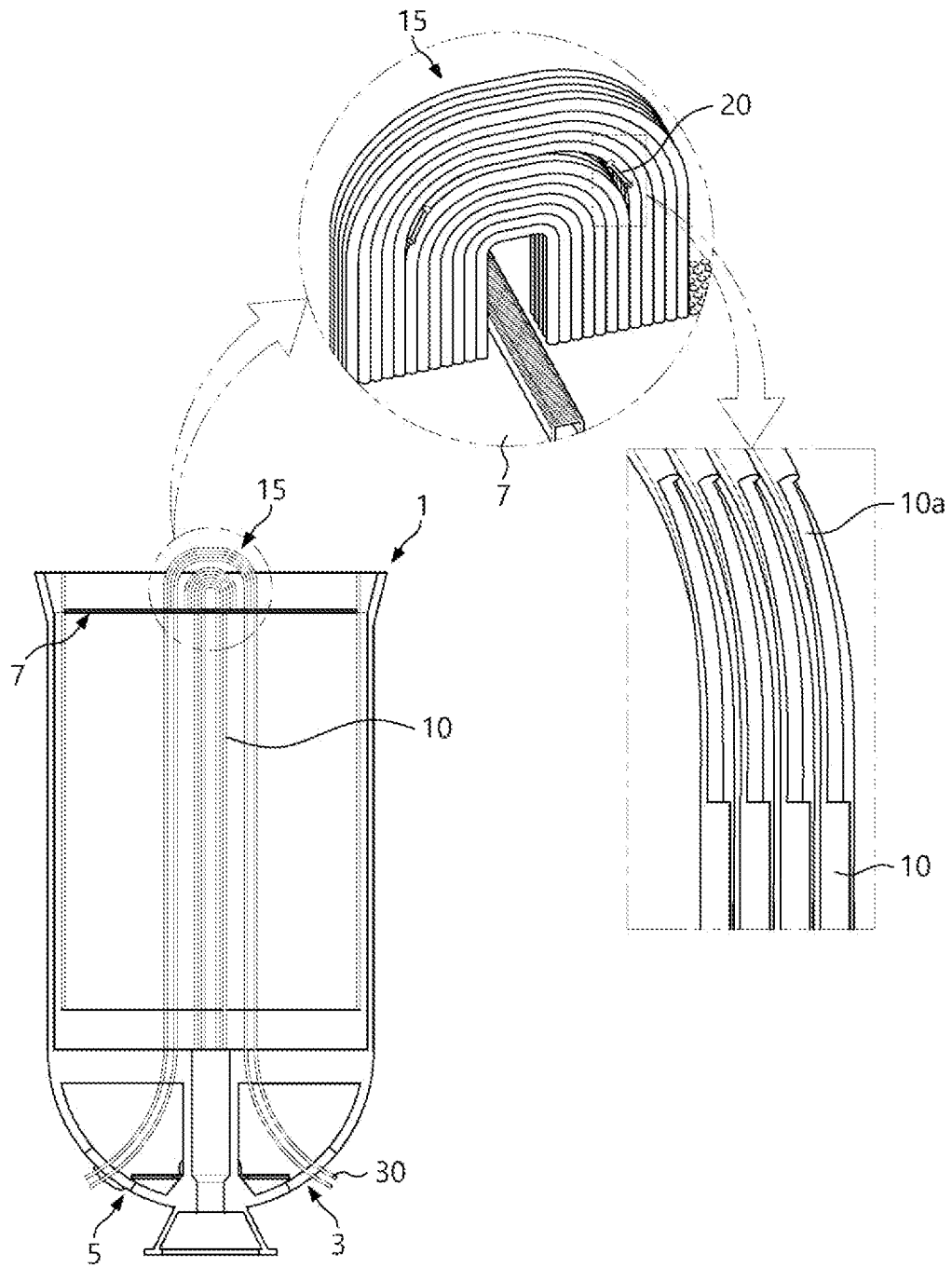
FIG. 1 is a diagram illustrating a steam generator and a bundle of heat transfer tubes inside the steam generator.
Figure 2:
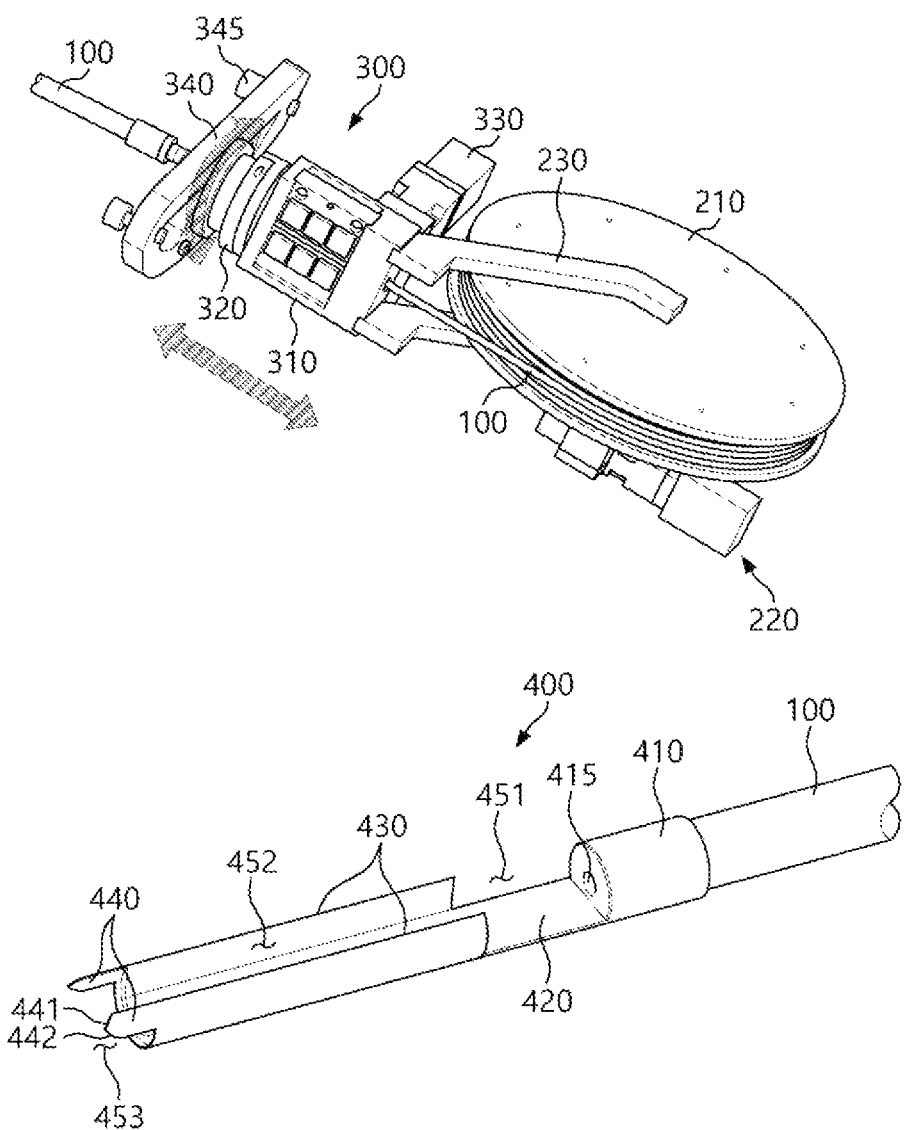
FIG. 2 is a diagram illustrating a device for removing a foreign object from a heat transfer tube according to an embodiment of the present disclosure.
Figure 3:
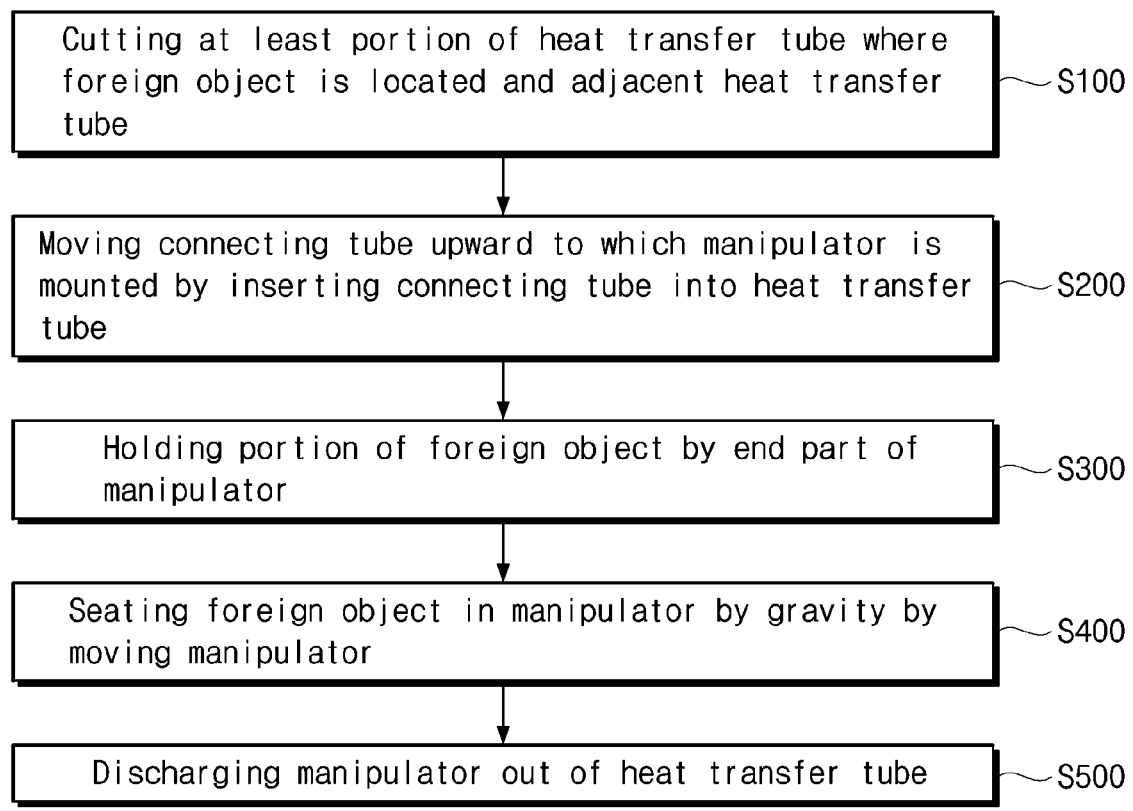
FIG. 3 is a flowchart of a method for removing a foreign object from a heat transfer tube according to the embodiment of the present disclosure.
Figure 4A:
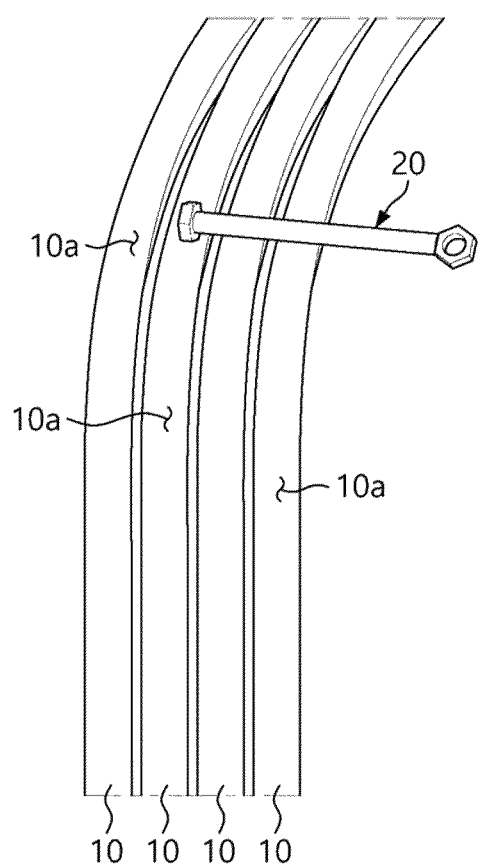
Figure 5:
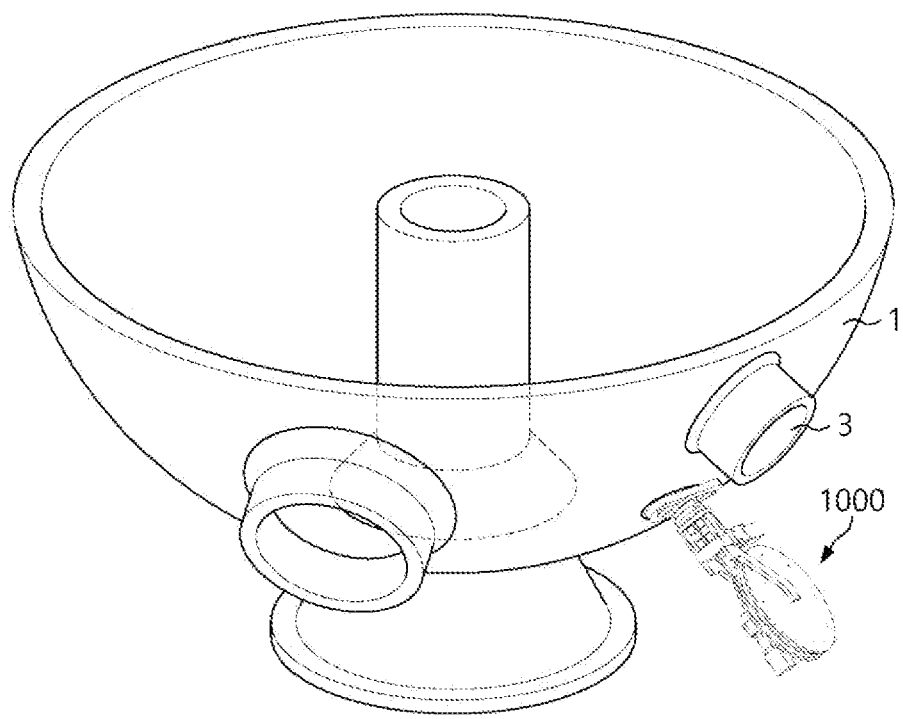
FIG. 5 is a diagram illustrating a state in which the device for removing a foreign object from a heat transfer tube is mounted to the steam generator.
Figure 6:
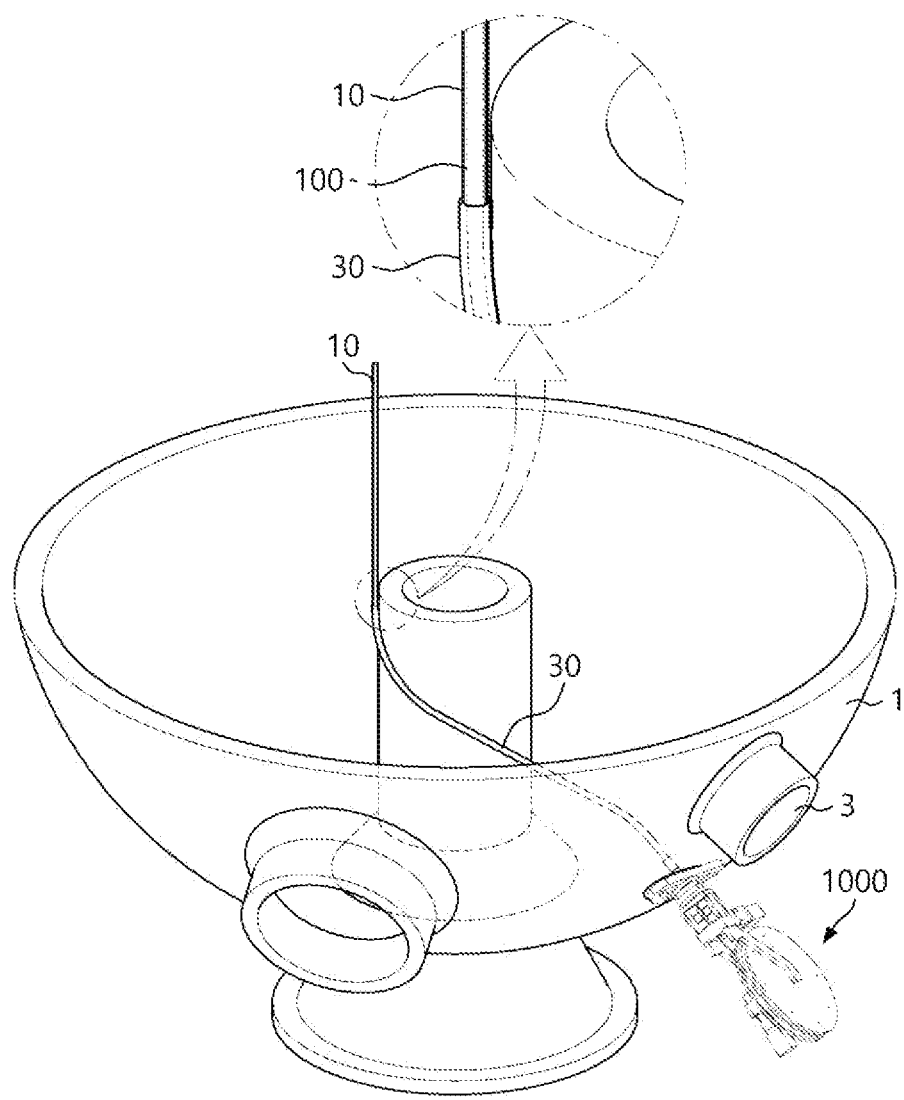
FIG. 6 is a diagram illustrating a state in which a connecting tube to which a manipulator is mounted is inserted into a heat transfer tube and is moved upward.
Figure 7A:
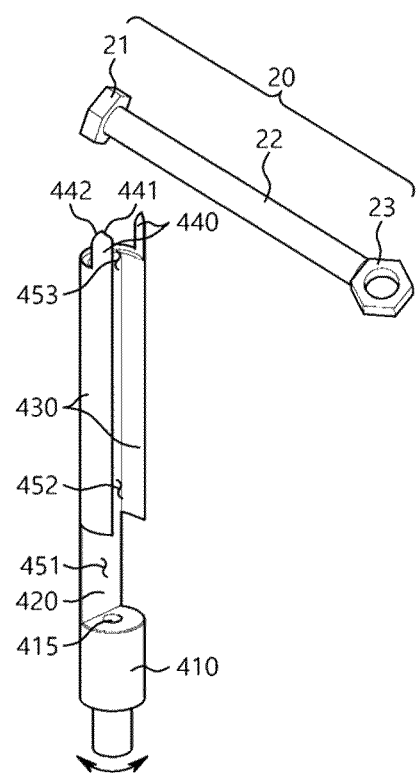
FIGS. 7A, 7B, 7C, and 7D are diagrams illustrating a state in which a portion of a foreign object is held on an end part of the manipulator, the foreign object is seated in the manipulator, and the manipulator is discharged to the outside of a heat transfer tube.
Figure 7B:
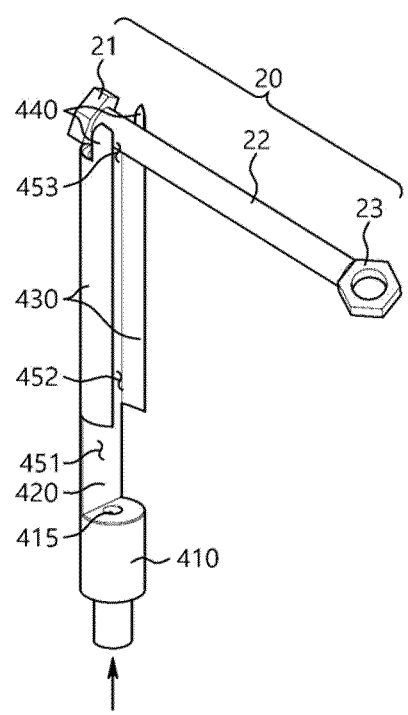
Figure 7C:
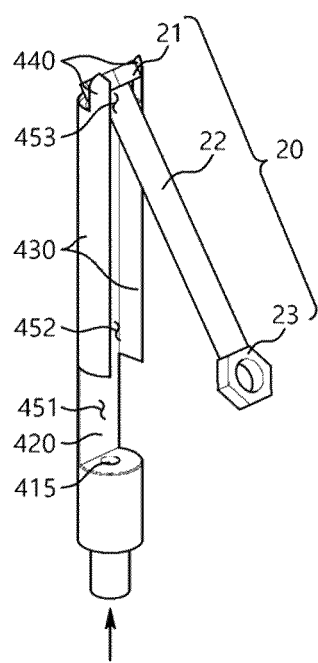
Figure 7D:
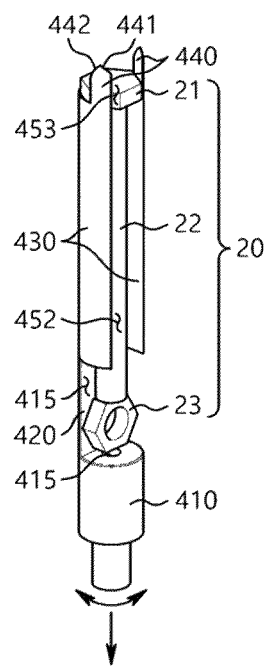

FIG. 1 is a diagram illustrating a steam generator and a bundle of heat transfer tubes inside the steam generator. FIG. 2 is a diagram illustrating a device for removing a foreign object from a heat transfer tube according to an embodiment of the present disclosure. FIG. 3 is a flowchart of a method for removing a foreign object from a heat transfer tube according to the embodiment of the present disclosure. FIGS. 4A and 4B are diagrams illustrating a state in which at least a portion of heat transfer tubes where a foreign object is located is cut. FIG. 5 is a diagram illustrating a state in which the device for removing a foreign object from a heat transfer tube is mounted to the steam generator. FIG. 6 is a diagram illustrating a state in which a connecting tube to which a manipulator is mounted is inserted into a heat transfer tube and is moved upward. FIGS. 7A, 7B, 7C, and 7D are diagrams illustrating states in which a portion of a foreign object is held on an end part of the manipulator, the foreign object is seated in the manipulator, and the manipulator is discharged to the outside of a heat transfer tube.

First, the steam generator 1 will be described hereinafter. The steam generator 1 includes an inlet 3 and an outlet 5 provided in a lower part thereof. In addition, many heat transfer tubes 10 are arranged by being connected from the center part of the steam generator 1 to the upper part thereof. A tube-supporting plate 7 is disposed on the upper side of the steam generator 1 to support the heat transfer tubes 10. The transfer tubes 10 extends, straightly in general, from the center part of the steam generator 1 to the tube-supporting plate 7. The heat transfer tubes 10 extend further upward than and through the tube-supporting plate 7 and are bent to be directed downward, and then extend downward. At least a part of the heat transfer tubes 10, especially including the bent portion of the heat transfer tubes 10, disposed on the upper side of the tube-supporting plate 7 may form a bundle 15. Foreign objects such as an eye bolt 20 may be present between the heat transfer tubes. The foreign object removing device introduced in this disclosure is effective in removing such foreign object from the heat transfer tube 10.

A guide tube 30 may be disposed in each of the inlet 3 and outlet 5 of the steam generator. The guide tube 30 may function to guide the connecting tube 100 of the device for removing a foreign object from the heat transfer tube 10 to be described later. The guide tube 30 can guide the manipulator 400 and the connecting tube 100 to the heat transfer tube 10. The connecting tube 100 may be inserted into the guide tube 30, and the guide tube 30 allows the connecting tube 100 may move toward and/or away from the heat transfer tube 10.

The device 1000 for removing a foreign object from a heat transfer tube according to the embodiment of the present disclosure includes a reel part 200, a drive part 300, and the manipulator 400.

The reel part 200 is configured to wind or unwind the connecting tube 100. The reel part 200 may include a reel body 210, a reel motor 220, and a reel connection part 230.

The reel body 210 forms a main body on which the connecting tube 100 is wound. The reel motor 220 provides power to rotate the reel body 210 so that the connecting tube 100 is wound on the reel body 210 or unwound from the reel body 210. The reel connection part 230 can connect the reel part 200 with the drive part 300 and is connected to the central part (i.e., a rotational center) of the reel body 210 so that the reel body 210 can easily rotate.

The drive part 300 is disposed to be adjacent to the reel part 200 and configured to operate to move the connecting tube 100 in and out of the heat transfer tube 10 and to rotate the connecting tube 100 inside the heat transfer tube 10.

The drive part 300 may include an up-and-down moving part 310, a rotation part 320, a drive part motor 330, a fixed plate 340, and a protrusion part 345.

The up-and-down moving part 310 can move the connecting tube 100 upward or downward. The connecting tube 100 is extended to the outside of the reel part 200 for introducing the connecting tube 100 into the heat transfer tube 10. On the other hand, the connecting tube 100 is wound on the reel part 200 by being moved out of and drawn back into the heat transfer tube 10.

The rotation part 320 can rotate the connecting tube 100 relative to an axial direction of the tube. Through this, the manipulator 400 to be described later can be rotated. The drive part motor 330 provides power to move the connecting tube 100 up and down or to rotate the connecting tube 100. The fixed plate 340 may be provided to fix the device 1000 for removing a foreign object from a heat transfer tube, specifically the reel part 200 and the drive part 300, to the steam generator 1. The fixed plate 340 may be provided with the protrusion part 345 to be fixed to the steam generator 1.

The manipulator 400 is disposed on the end part of the connecting tube 100, and is inserted into the heat transfer tube 10 so as to remove a foreign object disposed between heat transfer tubes 10. The manipulator 400 is formed such that at least a portion of the foreign object is held in the manipulator 400 and is transported, which will be described further in detail.

The manipulator 400 includes protruding parts configured to hold and move at least a portion of a foreign object. A foreign object is held in and fixed to the manipulator 400 and is introduced into (i.e., drawn into or brought into) the heat transfer tube 10 together with the manipulator 400 through such protruding parts. Then, the foreign object is moved in and along the transfer tube 400 and is drawn out of the heat transfer tube 10 and is finally discharged to the outside of the steam generator 1. These movement of the foreign object is synchronized with the motion of the manipulator 400, as the foreign object is securely held and affixed to the manipulator 400.

The manipulator 400 may include a first part 410, a second part 420, third parts 430, and the fourth parts 440.

The first part 410 may be formed to be fitted over the end part of the connecting tube 100. Specifically, the first part 410 is formed in a cylindrical shape having a central axis. The first part 410 and the and the connecting tube 100 are securely coupled to each other such that the first part 410 and the connecting tube 100 move up and down and/or rotate together. According to an embodiment, the one end of the first part 410 may have a concave part, and the connecting tube 100 is fitted into the concave part such that the manipulator 400 and the connecting tube 100 can be coupled to each other.

In the assembly of the manipulator 400 and the connecting tube 100, the direction from the connecting tube 100 toward the first part 410 along the central axis may be referred to as an upward direction and the opposite direction may be referred to as a downward direction. The upward direction and the downward direction may be collectively referred to as a longitudinal direction. Also, a radial outward direction may be defined as a direction from the central axis toward the circumference of the first part 410.

The second part 420 may protrude upward from the other end of the first part 410 along the longitudinal direction of the first part 410. According to an embodiment, the second part 420 may extend from only a portion of the circumference of the first part 410. According to an embodiment, one side surface of the second part 420 is formed by straightly extended from the portion of the circumference of the first part 410 while other side surface of the second part 420 is a flat surface. The flat surface may be in a rectangular shape one short side is in contact with the first part 410.

The third parts 430 may protrude respectively from two opposite ends of the second part 420 along directions of the circumference of the first part 410 so that an inner space is defined between the second part 420 and the third parts 430. The third parts 430 may be in a pair of two protrusions, each protruding from a long side of the rectangular shape of the second part 420 along the circumferential direction of the first part 410. The pair of the third parts 430 may face each other.

A direction in which a first one of the third parts 430 protrudes from one long side of the second part 420 may be referred to as a first circumferential direction and a direction in which a second one of the third parts 430 protrudes from the other long side of the second part 420 may be referred to as a second circumferential direction. An end of the first one of the third parts 430 in the first circumferential direction may be referred to as a first circumferential end of the third parts 430, and an end of the second one of the third parts 430 in the second circumferential direction may be referred to as a second circumferential end of the third parts 430. An area between the first circumferential end and the second circumferential end of the third parts 430 may be referred to as a second opening 452.

Specifically, referring to FIG. 2, the second part 420 has a shape protruding to have an area along a portion of the circumference of the first part 410. The third parts 430 forms a portion of a circular shape hollow inside along the circumferential direction of the second part 420 and have shapes protruding respectively from the opposite sides of the second part 420.

The third parts 430 may be positioned such that the third parts 430 and the first part 410 are spaced apart in the longitudinal direction. In other words, the downward end of the third part 430 and the upward end of the first part 410 may be spaced in the longitudinal direction.

The fourth parts 440 may respectively protrude upward from an upward end of the third parts 430 in the longitudinal direction. The fourth parts 440 may protrude further upward than an upward end of the second part 420. The fourth parts 440 may be in a pair of two protrusions, a first one of the fourth parts 420 protruding from the first one of the third parts 430 and a second one of the fourth parts 420 protruding from the second one of the third parts 430.

Referring to FIG. 2, each of the fourth parts 440 may include a first surface 441 and a second surface 442. Between the first surface 441 and the second surface 442, the first surface 441 is closer to the first-circumferential-direction end of the first one of the fourth parts 440. The first surface 441 may protrude further upward as a distance between the first surface 441 and the second opening 452 increases. That is, the first surface 441 protrudes further upward. The second surface 442 may bend and extend from the end part of the first surface 441 and may be introduced gradually downward as a distance between the second surface 442 and the second opening increase. That is, the second surface 442 is formed to be concave downward.

In other words, the first surface 441 of the first one of the fourth parts 440 is formed such that a protruding length of the first one of the fourth parts 440 gradually increases in the second circumferential direction. In contrast, the second surface 442 of the first one of the fourth pats 440 is formed such that a protruding length of the first one of the fourth parts 440 gradually decreases. The second one of the fourth parts 440 has a corresponding first surface 441 and a corresponding second surface 442.

Accordingly, a protruding vertex protruding upward is formed between the first surface 441 and the second surface 442. As described above, such protruding parts can hold a foreign object.

The manipulator 400 includes a first opening 451, the second opening 452, and a third opening 453 which are formed therein.

Specifically, the first opening 451 refers to an area formed between the first part 410 and the third parts 430, the second opening 452 refers to an area formed between the third parts 430 protruding from the opposite sides of the second part 420, and the third opening 453 refers to an area be formed between the fourth parts 440 and the second part 420.

Referring to FIGS. 7A, 7B, 7C, and 7D, the foreign object may be the eye bolt 20. In this case, the head 21 of the bolt 20 may be inserted into the third opening 453, the body 22 of the bolt 20 may be inserted into the second opening 452, and an end part 23 of the bolt 20, opposite to the head 21 of the bolt 20, may be inserted into the first opening 451.

The fourth parts 440 protrude respectively from the third parts 430 facing each other, and the fourth parts 440 facing each other may be configured to be manipulated so that a distance between the fourth parts 440 is decreased or increased. For example, in FIG. 7, before the head 21 of the bolt 20 is inserted into the third opening 453, a distance between the fourth parts 440 may be adjusted to be increased. In addition, after the head 21 of the bolt 20 is inserted into the third opening 453, the distance between the fourth parts 440 may be adjusted to be decreased.

According to the present disclosure, since the fourth parts 440 facing each other can be manipulated to decrease or increase a distance between the fourth parts 440, the distance between the fourth parts 440 may be adjusted according to a foreign object. In addition, after the foreign object is gripped or held, the distance between the fourth parts 440 may be decreased so that the foreign object gripped by the manipulator 400 is prevented from escaping to the outside.

Meanwhile, referring to FIG. 2, the manipulator 400 may further include a camera disposed inside the first part 410. In addition, in the first part 410 of the manipulator 400, a camera hole 415 may be formed in a center part of an upward end surface of the first part 410 facing the third parts 430 so that the camera can take a picture through the camera hole 415.

In the device 1000 for removing a foreign object from a heat transfer tube according to the present disclosure, when the foreign object (the bolt 20) is gripped, an environment at which the foreign object is located and the position of the foreign object can be identified through the camera disposed in the manipulator 400. This configuration improves the performance of the removal of the foreign object.

The method for removing a foreign object from a heat transfer tube according to the embodiment of the present disclosure will be described with reference to FIG. 3.

The method for removing a foreign object from a heat transfer tube includes cutting at least a portion of a heat transfer tube 10 where a foreign object is located and an adjacent heat transfer tube 10 at S100, moving the connecting tube 100 upward to which the manipulator 400 is mounted by inserting the connecting tube 100 into the heat transfer tube 10 at S200, holding a portion of the foreign object by an end part of the manipulator 400 at S300, seating the foreign object in the manipulator 400 by gravity by moving the manipulator 400 at S400, and discharging the manipulator 400 out of the heat transfer tube 10 at S500.

Referring to FIGS. 4A and 4B, in step S100 (the cutting of at least a portion of a heat transfer tube 10 where a foreign object is located and an adjacent heat transfer tube 10 at S100), the at least a portion of the heat transfer tube 10 where the foreign object (the bolt 20) is located and the adjacent heat transfer tube 10 thereto is cut to create an opening 10a. This is for introducing or receiving the foreign object (the bolt 20) into the heat transfer tube 10 through an opening 10a of the heat transfer tube 10 and discharge the foreign object to the outside of the steam generator 1.

Referring to FIGS. 5 and 6, in step S200 (the upward moving of the connecting tube 100 to which the manipulator 400 is mounted by inserting the connecting tube 100 into the heat transfer tube 10), the device 1000 is coupled to the steam generator 1, the manipulator 400 is mounted on the connecting tube 100, the connecting tube 100 with the manipulator 400 mounted on is introduced into the steam generator 1. Then, the connecting tube 100 is inserted into the heat transfer tube 10, and the connecting tube 100 is moved upward to the upper part of the heat transfer tube 10 toward the opening 10a. For this operation, the drive part 300 and the reel part 200 may be operated to extend the connecting tube 100 out of the real part 200.

Referring to FIG. 7, in step S300 (the holding of a portion of the foreign object on the end part of the manipulator 400), the head 21 of the bolt 20 may be held by the end part of the manipulator 400. Specifically, the head 21 of the bolt 20 may be held by the fourth parts 440 of the manipulator 400.

In addition, in step S400, the foreign object is seated in the manipulator 400 by gravity by moving the manipulator 400 up and down. For example, while the head 21 of the bolt 20 is held by the fourth parts 440 of the manipulator 400, the manipulator 400 is moved upward. Accordingly, the body 22 of the bolt 20 may be inserted through the second opening 452 into a space between the third parts 430 by gravity. In addition, by rotating the manipulator 400, another end part of the bolt 20 may be inserted into the first opening 451. That is, by rotating the manipulator 400, the foreign object is seated in the manipulator 400, and is held so as not to be moved out of the cut heat transfer tube.

In the holding of a foreign object by the end part of the manipulator 400 or in the seating of a foreign object in the manipulator 400 by gravity, the manipulator 400 may perform at least one of an upward movement, a downward movement, and a rotation inside the heat transfer tube 10.

Next, the foreign object removal method includes step S500, which is the discharging of the manipulator 400 out of the heat transfer tube 10. After the bolt 20 (the foreign object) is inserted into the manipulator 400, the drive part 300 and the reel part 200 are operated so that the manipulator 400 can be discharged to the outside of the heat transfer tube 10. Accordingly, the bolt 20 held in the manipulator 400 may be discharged to the outside of the steam generator 1 along the heat transfer tube 10.

In the device 1000 for removing a foreign object from a heat transfer tube according to the embodiment of the present disclosure, the manipulator 400 includes the protruding parts on which at least a portion of a foreign object can be held, which includes the first part 410, the second part 420, the third parts 430, and the fourth parts 440, and areas/spaces in which the foreign object can be accommodated, which includes the first opening 451, the second opening 452, and the third opening 453.

In addition, in the device 1000 for removing a foreign object from a heat transfer tube according to the embodiment of the present disclosure, since the manipulator 400 can move up and down and rotate, the manipulator 400 is configured such that a bulky foreign object like the bolt 20 may be seated in small areas in the first opening 451, the second opening 452, and the third opening 453 described above and be more easily accommodated therein.

Accordingly, a bulky foreign object, such as the bolt 20, can be accommodated by the manipulator 400 and more easily discharged to the outside of the steam generator 1 through the heat transfer tube 10.

Figure 8A:
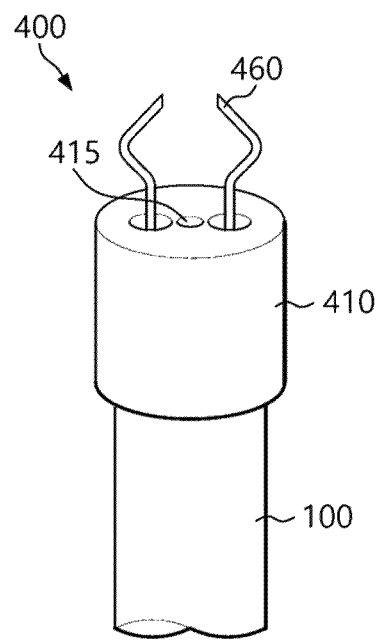
Figure 8B:
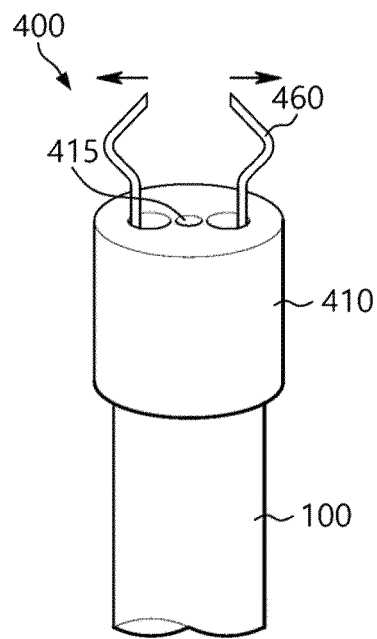

FIGS. 8A, 8B, and 8C are diagrams illustrating a manipulator according to another embodiment of the present disclosure.

Referring to FIGS. 8A, 8B, and 8C, the manipulator 400 of the device 1000 for removing a foreign object from a heat transfer tube according to the another embodiment of the present disclosure may include the first part 410 fitted over the end part of the connecting tube 100, and a pair of grippers 460 provided respectively on opposite sides of the first part 410 by protruding from the first part 410. The distance between the grippers 460 may be adjusted (i.e., may be increased and decreased) as a distance between positions of the grippers 460 and the first part 410 increases. In other words, as the distance between the grippers 460 and the first part 410 decreases, the distance between the gripers 460 may also decrease or increase.

Through this shape, the grippers 460 can grip not only the head 21 of the bolt 20, but also the body 22 of the bolt 20. Accordingly, when it is difficult for the manipulator 400 inserted through the heat transfer tube 10 to grip the end part of the bolt 20, the manipulator 400 according to the embodiment of the present disclosure can grip the body 22 of the bolt 20 and easily move the bolt 20.

In addition, the grippers 460 may be configured to be manipulated so that the distance between the grippers 460 increases and decreases. Additionally, the grippers 460 may be configured to be rotatable.

Through this operation, the bolt 20 can be inserted into the heat transfer tube 10 by the manipulator 400 and discharged out of the heat transfer tube 10. In addition, the body 22 of the bolt 20 is adjusted by the manipulator 400 so that the head 21 of the bolt 20 can be disposed to be located at the heat transfer tube 10. Through this, the bolt 20 can be more easily inserted into the heat transfer tube 10.

The present disclosure has been described with reference to the embodiments illustrated in the drawings, but these embodiments are merely illustrative, and those skilled in the art will understand that various modified embodiments and equivalent other embodiments are possible therefrom. Therefore, the scope of technical protection of the present disclosure should be determined by the technical spirit of the attached claims. Also, it is noted that any one feature of an embodiment of the present disclosure described in the specification may be applied to another embodiment of the present disclosure. Similarly, the present invention encompasses any embodiment that combines features of one embodiment and features of another embodiment.

The invention claimed is:

1. A device for removing a foreign object from a heat transfer tube, the device comprising:
    a reel part configured to wind or unwind a connecting tube;
    a drive part, disposed adjacent to the reel part, configured to move the connecting tube in and out of a heat transfer tube and to operate so that the connecting tube is rotatable inside the heat transfer tube; and
    a manipulator, disposed on an end part of the connecting tube, configured to be inserted into the heat transfer tube and to remove a foreign object placed between the heat transfer tube and an adjacent heat transfer tube,
    wherein the manipulator is configured to hold and transport at least a portion of the foreign object,
    wherein the manipulator comprises:
    a first part fixedly coupled with the end part of the connecting tube;
    a second part protruding upward from the first part along a portion of a circumference of the first part; and
    third parts protruding from two opposite ends of the second part along a circumferential direction of the first part such that an inner space is defined between the second part and the third parts.

2. The device of claim 1, wherein the manipulator comprises fourth parts protruding upward from end parts of the third parts, respectively, in a direction parallel to a protruding direction of the second part, the fourth parts protruding further upward than the second part.

3. The device of claim 2, wherein each of the fourth parts comprises:
    a first surface protruding further upward as a distance between the first surface and an opening between the third parts increases; and
    a second surface bending and extending from an end part of the first surface, with the second surface being introduced gradually downward as a distance between the second surface and the opening between the third parts increases.

4. The device of claim 3, wherein a first opening is formed between the first part and the third parts,
    a second opening is formed between the third parts protruding respectively from opposite sides of the second part, and
    a third opening is formed between the fourth parts and the second part.

5. The device of claim 4, wherein the foreign object is an eye bolt,
    a head of the bolt is inserted into the third opening,
    a body of the bolt is inserted into the second opening, and
    an end part of the bolt opposite to the head of the bolt is inserted into the first opening.

6. The device of claim 2, wherein the fourth parts protrude respectively from the third parts facing each other, and
    the fourth parts facing each other are configured to be manipulated so that a distance between the fourth parts decreases or increases.

7. The device of claim 1, wherein the manipulator further comprises a camera disposed inside the first part, and
    a camera hole is formed in a center part of a surface of the first part facing the third parts such that the camera is capable of taking a picture through the camera hole.

8. A method for removing a foreign object from a heat transfer tube, the method comprising:
    cutting at least a portion of a heat transfer tube where a foreign object is located and an adjacent heat transfer tube;
    moving a connecting tube upward to which a manipulator is mounted by inserting the connecting tube into the heat transfer tube;
    holding a portion of the foreign object by an end part of the manipulator;
    seating the foreign object in the manipulator by gravity by moving the manipulator; and
    discharging the manipulator out of the heat transfer tube-wherein the manipulator comprises:
    a first part fixedly coupled with an end part of the connecting tube;
    a second part protruding upward from the first part along a portion of a circumference of the first part; and
    third parts protruding from two opposite ends of the second part along a circumferential direction of the first part such that an inner space is defined between the second part and the third parts.

9. The method of claim 8, wherein the manipulator comprises fourth parts protruding upward from end parts of the third parts, respectively, in a direction parallel to a protruding direction of the second part, the fourth parts protruding further upward than the second part.

10. The method of claim 9, wherein each of the fourth parts comprises:
    a first surface protruding further upward as a distance between the first surface and an opening between the third parts increases; and
    a second surface bending and extending from an end part of the first surface, with the second surface being introduced gradually downward as a distance between the second surface and the opening between the third parts increases.

11. The method of claim 10, wherein a first opening is formed between the first part and the third parts,
    a second opening is formed between the third parts protruding respectively from opposite sides of the second part, and
    a third opening is formed between the fourth parts and the second part.

12. The method of claim 11, wherein the foreign object is an eye bolt,
    a head of the bolt is inserted into the third opening,
    a body of the bolt is inserted into the second opening, and an end part of the bolt opposite to the head of the bolt is inserted into the first opening.

13. The method of claim 9, wherein the fourth parts protrude respectively from the third parts facing each other, and
the fourth parts facing each other are configured to be manipulated so that a distance between the fourth parts decreases or increases.

14. The method of claim 8, wherein the manipulator further comprises a camera disposed inside the first part, and
a camera hole is formed in a center part of a surface of the first part facing the third parts such that the camera is capable of taking a picture through the camera hole.

15. A method for removing a foreign object from a heat transfer tube, the method comprising:
cutting at least a portion of a heat transfer tube where a foreign object is located and an adjacent heat transfer tube;
moving a connecting tube upward to which a manipulator is mounted by inserting the connecting tube into the heat transfer tube;
holding a portion of the foreign object by an end part of the manipulator;
seating the foreign object in the manipulator by gravity by moving the manipulator; and
discharging the manipulator out of the heat transfer tube,
wherein in the seating of the foreign object in the manipulator by gravity,
the manipulator performs at least one of an upward movement, a downward movement, and a rotation inside the heat transfer tube.

* * * * *